United States Patent
Shirriff et al.

(10) Patent No.: US 9,538,459 B1
(45) Date of Patent: Jan. 3, 2017

(54) ADAPTIVE SCANNING BASED ON USER ACTIVITY

(71) Applicant: Google Inc., Mountain View, CA (US)

(72) Inventors: Kenneth William Shirriff, Redwood City, CA (US); Damian Gajda, San Jose, CA (US); Chandrasekhar Thota, Saratoga, CA (US); Matthew Joelson Secor, Pal Alto, CA (US); Prasad Haridass, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/585,273

(22) Filed: Dec. 30, 2014

(51) Int. Cl.
*H04W 48/08* (2009.01)
*H04W 48/10* (2009.01)
*H04W 48/12* (2009.01)
*H04W 48/14* (2009.01)
*H04W 48/16* (2009.01)
*H04W 52/02* (2009.01)

(52) U.S. Cl.
CPC ............. *H04W 48/16* (2013.01); *H04W 48/08* (2013.01); *H04W 48/10* (2013.01); *H04W 48/12* (2013.01); *H04W 48/14* (2013.01); *H04W 52/0251* (2013.01); *H04W 52/0254* (2013.01)

(58) Field of Classification Search
None
See application file for complete search history.

(56) References Cited

U.S. PATENT DOCUMENTS

| | | | |
|---|---|---|---|
| 8,326,290 B2 * | 12/2012 | Mortti | H04M 1/0245 455/160.1 |
| 2006/0046653 A1 | 3/2006 | Kirbas | |
| 2006/0119508 A1 * | 6/2006 | Miller | G01S 19/34 342/357.77 |
| 2009/0068970 A1 * | 3/2009 | Ahmed | H04W 48/16 455/161.1 |
| 2011/0045846 A1 * | 2/2011 | Rekimoto | G01S 5/0018 455/456.1 |
| 2014/0105086 A1 | 4/2014 | Chhabra et al. | |
| 2014/0135042 A1 * | 5/2014 | Buchheim | G01S 1/68 455/456.6 |
| 2014/0171053 A1 * | 6/2014 | Stephens | H04W 52/0251 455/418 |
| 2015/0282141 A1 * | 10/2015 | Yamamoto | H04W 8/18 370/329 |

* cited by examiner

*Primary Examiner* — King Poon
*Assistant Examiner* — Vincent Peren
(74) *Attorney, Agent, or Firm* — Dority & Manning, P.A.

(57) ABSTRACT

Systems and methods for adaptively scanning for one or more beacon devices based at least in part on user activity are provided. More particularly, a user device can scan for one or more beacon devices at a first scan rate. The user device can detect a trigger event based at least in part on data indicative of an activity level, such as data indicative of a status of a display, data determined from one or more motion sensors, a number of beacon devices detected by the mobile device during a time period, data indicative of prior interactions with beacon device information, or data indicative of a charging status of a battery associated with the mobile device. The trigger event can signify a change in an activity level associated with the user device. Responsive to the trigger event, the user device can adjust the scan rate from the first scan rate to a second scan rate.

18 Claims, 5 Drawing Sheets

ADAPTIVE SCANNING BASED ON USER ACTIVITY

FIELD

The present disclosure relates generally to beacon devices and more particularly to adapting scanning for beacon devices based on user activity.

BACKGROUND

In recent years, location based functionality associated with mobile computing devices has become increasingly popular. Location based functionality can allow a user device, such as a smart phone, tablet or wearable computing device, to receive information and to perform actions associated with the information. Such location based functionality can be implemented, for instance, through the use of beacon devices. Beacon devices are a recent technology that can be used, for instance, in determining proximity and location. A beacon device is a small, low cost, self-contained device that can periodically provide (e.g. broadcast using a short range wireless communication technology) information. A user device can receive the information and use the knowledge of the identity of the beacon device and proximity to the beacon device for various purposes, including communication, asset tracking, retail identification, safety, localization, etc.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of scanning for a beacon device. The method includes scanning, by one or more computing devices, for one or more beacon devices at a first scan rate. Each beacon device periodically broadcasts data over a distance. The method further includes detecting, by the one or more computing devices, a trigger event based at least in part on data indicative of an activity level associated with the one or more computing devices. The method further includes, responsive to the trigger event, scanning, by the one or more computing devices, for one or more beacon devices at a second scan rate. The second scan rate is different than the first scan rate.

Other aspects of the present disclosure are directed to systems, apparatus, tangible, non-transitory computer-readable media, user interfaces and devices for scanning for beacon devices based at least in part on user activity.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
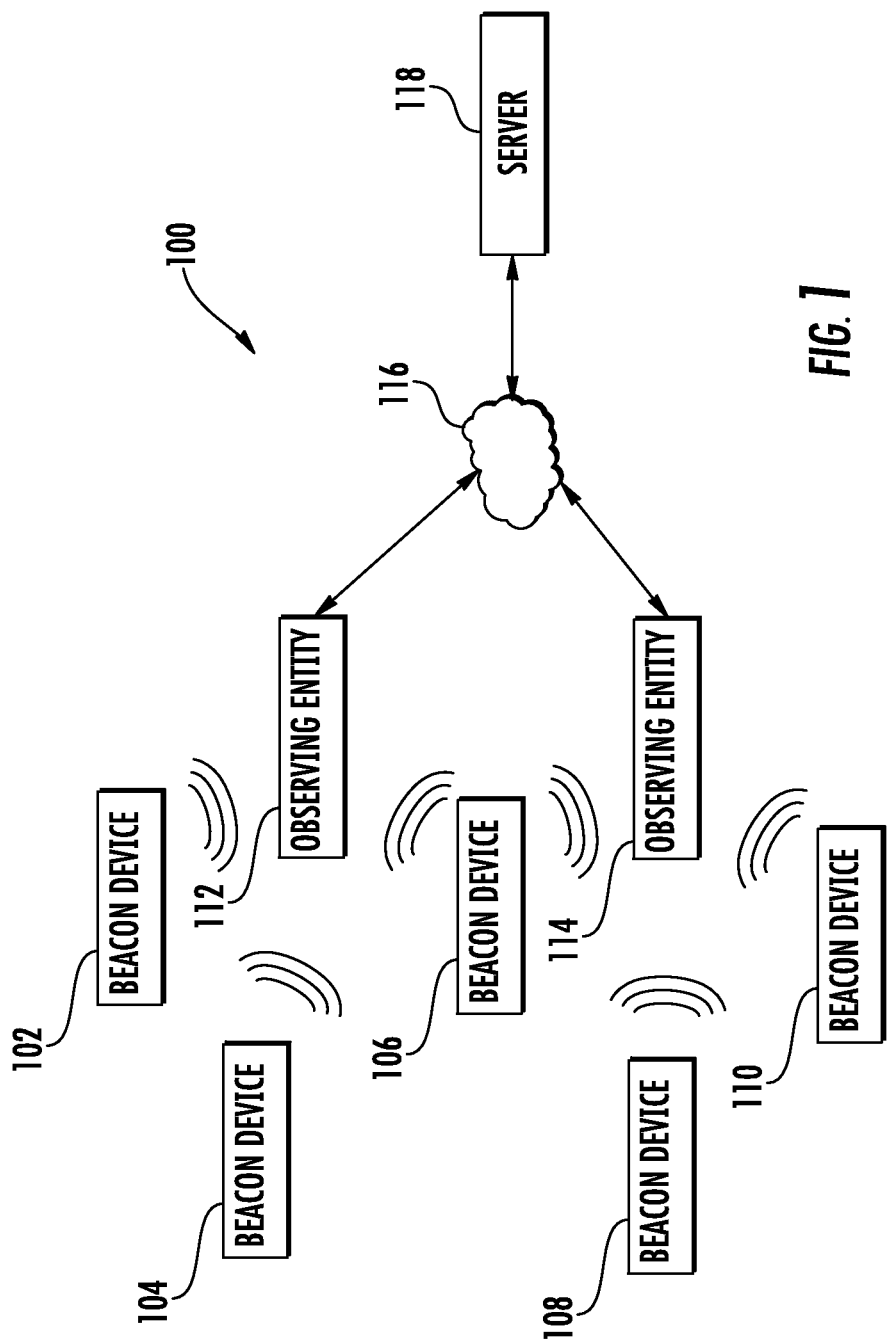
FIG. 1 provides an example system according to example embodiments of the present disclosure.

Reference will now be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Overview

Example aspects of the present disclosure are directed to adaptive scanning for one or more beacon devices based at least in part on user activity with a computing device, such as a smartphone, tablet, wearable computing device, or other computing device. A beacon device can be a communication device having a known location that periodically broadcasts (e.g. using short range wireless communication technology) information identifying the beacon device. A beacon device can be, for instance, a radio frequency (RF) beacon device (e.g. a Bluetooth™ Low Energy (BLE) beacon device), an infrared beacon device, or a radio frequency identification (RFID) tag.

One or more user devices (e.g. smartphones, tablets, wearable computing devices, etc.) can scan for and receive information from beacon devices. In particular, a beacon device can broadcast an identifier, such as a universally unique identifier (UUID), a URL, a sequence of bytes, or an encrypted identifier. A user device can receive the identifier associated with the beacon device, and can use this identifier to ascertain other information associated with the beacon device. Such other information can include, for instance, location information (e.g. latitude, longitude coordinates) that the user device can use to determine proximity to the beacon device, and thus to a corresponding geographic location. This can be used, for instance, for navigation purposes. The beacon device can also be used to provide information, for instance, used to provide a notification or to open an application associated with the beacon device.

Scanning for beacon devices can use a significant amount of power, which can cause battery drain in a user device. For instance, scanning for a beacon device can cause a user device to activate a radio associated with the user device, send a response to the beacon device over the radio (if the beacon device is configured for active scanning), and/or to use the user device's central processing unit to process the beacon information, all of which can require significant power resources. One solution to this problem can be to scan for beacon devices infrequently. However, scanning infrequently can cause a delay in receiving beacon information, and can even cause a user device to miss a beacon device entirely.

According to example aspects of the present disclosure, a user device can conserve power by adaptively adjusting the frequency with which it scans for nearby beacon devices based at least in part on user activity with the user device. A scan rate can be determined proportionally to an activity level. In particular, a user device can increase or decrease the rate at which it scans for beacon devices as an activity level associated with the user device increases or decreases.

In an example embodiment, a user device can detect a trigger event. A trigger event can be determined based at least in part on an activity level associated with a user device. In particular, a trigger event can signify a change in an activity level associated with the user device. For instance, a trigger event can be detected when a display of a user device turns from off to on, or when a battery of a user device begins charging. Responsive to the trigger event, the user device can adjust the rate at which it scans for one or more beacon devices. In particular, responsive to the trigger event, the user device can adjust the scan rate from a first scan rate to a second scan rate. The second scan rate can be increased relative to the first scan rate.

According to example aspects of the present disclosure, a trigger event can be determined based on several factors. For instance, in one embodiment, a trigger event can be determined based at least in part on whether a display associated with the user device is turned on or off. In particular, a user device can reduce its scan rate or stop scanning altogether when the display is turned off. When the display is turned on, the user device can increase its scan rate.

In another embodiment, a trigger event can be determined based at least in part on physical activity of a user, such as for instance, whether a user of a user device is walking, running, driving, looking at the display, etc. The physical activity can be determined based at least in part on various sensors associated with the user device, such as for instance, accelerometers, gyroscopes, barometers, a positioning system (e.g. a GPS or other positioning system), etc. The scan rate can be adapted based on the various user activities. For instance, if a user is walking and/or looking at the display the scan rate can be increased. If the user is running, bicycling, or driving, the scan rate can be decreased.

In yet another embodiment, a trigger event can further be determined based at least in part on whether a battery of a user device is charging. Power conservation can be less important for a user device that is charging. Accordingly, a user device can increase its scan rate while the user device is charging, and decrease its scan rate while the user device is not charging.

In yet another embodiment, a trigger event can be determined based at least in part on prior user interactions with detected beacon devices. In particular, an activity level can be determined based at least in part on the number of beacons detected by the user device as well as interaction patterns of a user relating to notifications associated with detected beacon devices. For instance, if a user has recently encountered many beacons (e.g. if the user is in a museum) and/or has interacted with these beacons, the scan rate can be increased. If the user rarely encounters beacons (e.g. if the user lives in a rural area), and/or if the user rarely interacts with information associated with beacons, the scan rate can be decreased.

In an example embodiment, a user device can adjust its scan rate over a period of time. For instance, responsive to a trigger event indicative of the fact that a display of a user device has been turned on, the user device can initially increase its scan rate for some period of time. Such increase in scan rate can facilitate a quicker initial detection of one or more beacon devices proximate the user. Once this period of time has elapsed, the user device can subsequently reduce its scan rate. For instance, when a user device's display is turned on, the user device can scan at an increased rate for 10 seconds. This 10 second period of scanning at an increased rate can allow a user device to immediately or almost immediately detect one or more beacon devices proximate the user device. After the 10 second period has elapsed, the user device can reduce its scan rate to conserve power.

In an example implementation, a user travels in an automobile from a first location to a second location. While driving, the user holds a user device in the user's pocket with the display turned off. While driving with the display turned off, the user device can scan for one or more beacon devices at a first scan rate of 1% (e.g. 1.5 seconds of scanning per every 2.5 minutes). Once the user reaches the second location, the user turns the display of the user device on. Responsive to the user turning on the display, the user device can scan for one or more beacon devices at a second scan rate of 100% for a 10 second period of time. After this 10 second period elapses, the user device can scan for one or more beacon devices at a reduced scan rate of 10% (e.g. 1.5 seconds of scanning per every 15 seconds). The user then turns the display off and, responsive to this trigger event, the user device can reduce the scan rate back to 1%.

Example Beacon Device System

FIG. 1 depicts an example system 100 according to an example embodiment of the present disclosure. System 100 can include a plurality of beacon devices 102-110, one or more observing entities 112 and 114, and at least one server 118. Beacon devices 102-110 can be used for many different applications, including, for example, co-presence (e.g. two entities becoming aware of each other), location-based gaming, asset tracking, beacon device localization or observing entity localization, telemetry, information provisioning (e.g. use of an observing entity to obtain various information such as semantic information or geographic information associated with beacon devices 102-110 as the observing entity moves about the world), intra-beacon communication, payment systems, etc. Further applications can include providing information associated with a business, such as discount coupons or hours of operation, providing information associated with a museum exhibit, providing information associated with a transit schedule, etc. The present disclosure provides a general system that can be applicable to the above noted applications or other applications as well.

Beacon devices 102-110 can be computing devices that are configured to emit messages. For example, the messages can include data that is broadcast by the beacon devices 102-110. In example embodiments, the data can be used for the purpose of being "noticed" without requiring a two-way connection. Thus, in such embodiments, the entirety of the interaction between the beacon devices 102-110 and the observing entities 112 and 114 can be performed without requiring a connection between the observing entity and the beacon device or a connection between the beacon device and the server. Instead, all relevant information for the interaction is contained within the data emitted by the beacon device. Limiting beacon device interaction to the broadcasting of data can provide a nominal behavior that allows energy consumption and service life to be modeled and reasonably predicted.

As an example, the beacon devices 102-110 can broadcast the data using short range wireless communication technologies such as, for example, Bluetooth, Bluetooth low energy, ZigBee, Near Field Communication, WiFi Direct, or other technologies. Furthermore, although short range wireless communication technologies are provided as an example, any communication method can be used to transmit data from the beacon devices 102-110 to the observing entities 112 and 114, including, for example, wired connections, general radio frequency communication, optical communication, infrared communication, magnetic communication, or other communication methods.

In embodiments in which beacon devices employ Bluetooth low energy (BLE) technology for broadcasting, each message can carry a 31-byte payload. As noted, messages can be broadcast events that are capable of being received and processed by any listening device (e.g. observing entity). Further, the above example implementation using BLE technology is provided as an example only. Other suitable communication protocols having different frame formats or channel assignments can be used, as well. In addition, as certain protocols are modified or replaced over time, the present disclosure can be easily adapted for implementation using such new protocols.

Server 118 can include one or more computing devices configured to communicate with observing entities 112 and 114 over a network 116. As an example, server 118 can be one or more server computing devices. In the instance that a plurality of server computing devices are used, the server computing devices can be arranged according to any suitable computing architecture, including sequential computing architectures, parallel computing architectures, or combinations thereof. Observing entities 112 and 114 can be user devices (e.g. smartphones, tablets, wearable computing devices, or any other suitable mobile computing device capable of being carried by a user while in operation), such as user device 510 depicted in FIG. 6.

Network 116 can be any type of communications network, such as a local area network (e.g., intranet), wide area network (e.g., Internet), or some combination thereof and can include any number of wired or wireless links. In general, communication between the server 118 and observing entities 112 and 114 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Furthermore, although each observing entity 112 and 114 is shown as communicating directly with the server 118 over network 116, there may be any number of intervening devices between the observing entity 112 or 114 and the server 118. As an example, in some embodiments, groups of observing entities can be organized in a network (e.g. a mesh network) and can relay messages back and forth from a particular observing entity to the server 118.

Example Methods for Scanning for Beacon Devices

Figure 2:
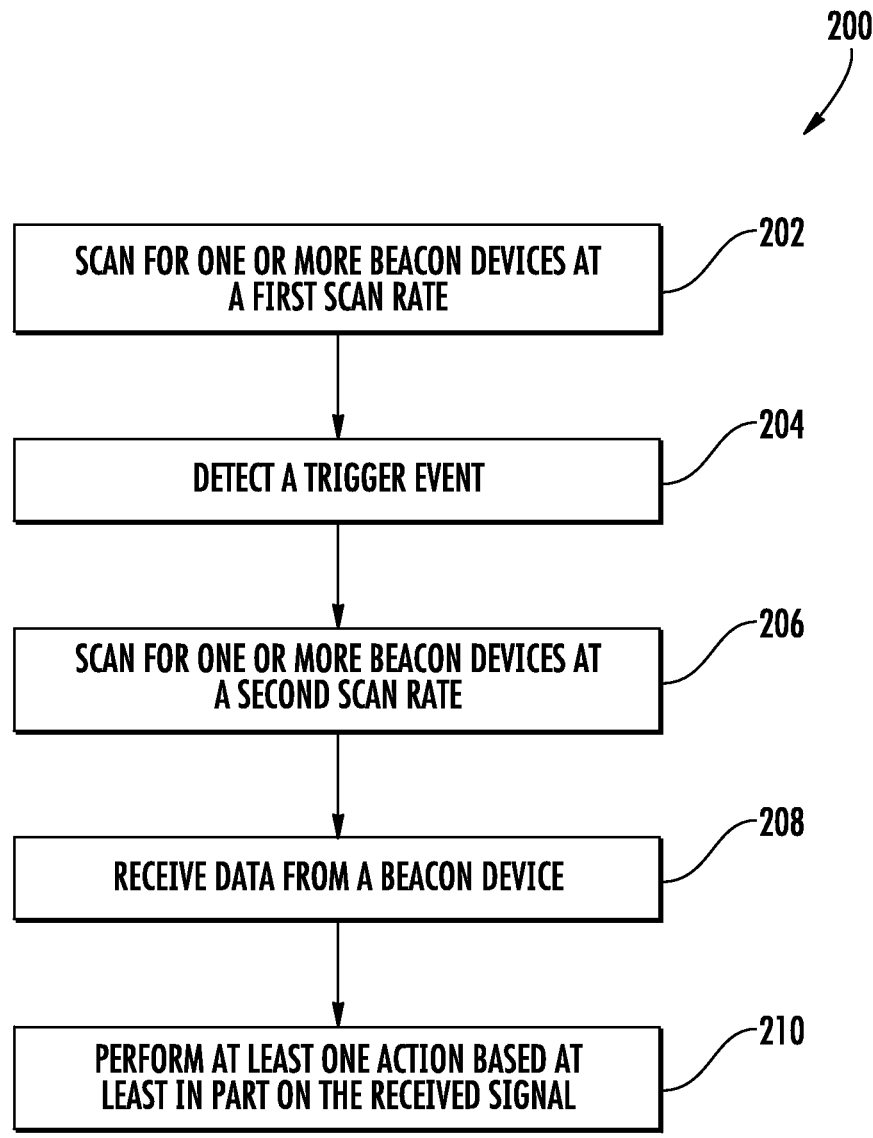
FIG. 2 provides a flow diagram of an example method of scanning for a beacon device according to example embodiments of the present disclosure.

FIG. 2 depicts a flow diagram of an example method (200) for scanning for one or more beacon devices according to example embodiments of the present disclosure. Method (200) can be implemented by one or more computing devices, such as one or more of the computing devices depicted in FIG. 6. In addition, FIG. 2 depicts steps performed in a particular order for purposes of illustration and discussion. Those of ordinary skill in the art, using the disclosures provided herein, will understand that the various steps of any of the methods disclosed herein can be omitted, adapted, modified, rearranged, or expanded in various ways without deviating from the scope of the present disclosure.

Method (200) can include scanning for one or more beacon devices at a first scan rate (202). Each beacon device can periodically wirelessly broadcast data over a distance. The data can be, for instance, information associated with a location of the beacon device (e.g. latitude, longitude coordinates), or other suitable data. In some implementations, the first scan rate can be determined based at least in part on an activity level associated with a user device. For instance, the first scan rate can be determined proportionally to an activity level. A user device can be a smartphone, tablet, cellular telephone, wearable computing device or any other suitable computing device capable of being carried by a user while in operation.

According to example embodiments of the present disclosure, an activity level can be indicative of a level of use of a user device at a particular time. An activity level can be determined based at least in part on the likelihood of a user of a user device to interact with beacon information at a particular time. In particular, an activity level can increase as a user's likelihood to interact with beacon information increases. A likelihood of beacon interaction for a user can be determined based at least in part on various factors. Examples of such factors include a status of a display associated with a user device (e.g. whether the display is turned on or off), physical activity of a user (e.g. whether the user is walking, running, driving, looking at the display, etc.), the number of beacons detected by a user device, and/or prior interactions of a user with beacon devices (e.g. whether a user typically interacts with beacon notifications). Such factors can be used to determine an activity level for a user device at a particular time, and thus a corresponding scan rate for that particular time.

For instance, a user can be more likely to interact with beacon information if the user is looking at a turned on display of a user device than if the user device is in the user's pocket with the display turned off. Accordingly, a user device with a display currently being viewed by a user can have a higher activity level than a user device with a display that is turned off. As another example, a user may be more likely to interact with beacon information if the user is walking than if the user is running, bicycling, driving, etc. Accordingly, a user device can have a relatively higher activity level if a user is walking with the user device and a relatively lower activity level if the user is running, bicycling, driving, etc. with the user device.

In other example embodiments of the present disclosure, an activity level can further be determined based at least in part on the importance of power conservation in the user device at a particular time. For instance, if a user device is charging or fully charged, power conservation can be less important, but if a user device has, for instance, less than half a charge, power conservation can be more important. Accordingly, a user device with a fully charged or charging battery can have higher activity level than a user device with a battery that is not charging.

Referring to FIG. 2 at (204), the method can include detecting a trigger event (204). The trigger event can be determined based at least in part on data indicative of an activity level. More particularly, a trigger even can signify a change in activity level. Responsive to the trigger event, method (200) can include scanning for one or more beacon devices at a second scan rate (206). The second scan rate can be different than the first scan rate. The second scan rate can be determined based at least in part on an activity level. The second scan rate, for instance, can be determined proportionally to the activity level. For instance, a trigger event can signify that the display of a user device has been turned from on to off. Responsive to this trigger event, a user device can scan at a second scan rate determined based at least in part on an activity level associated with the display being turned off.

Figure 3:
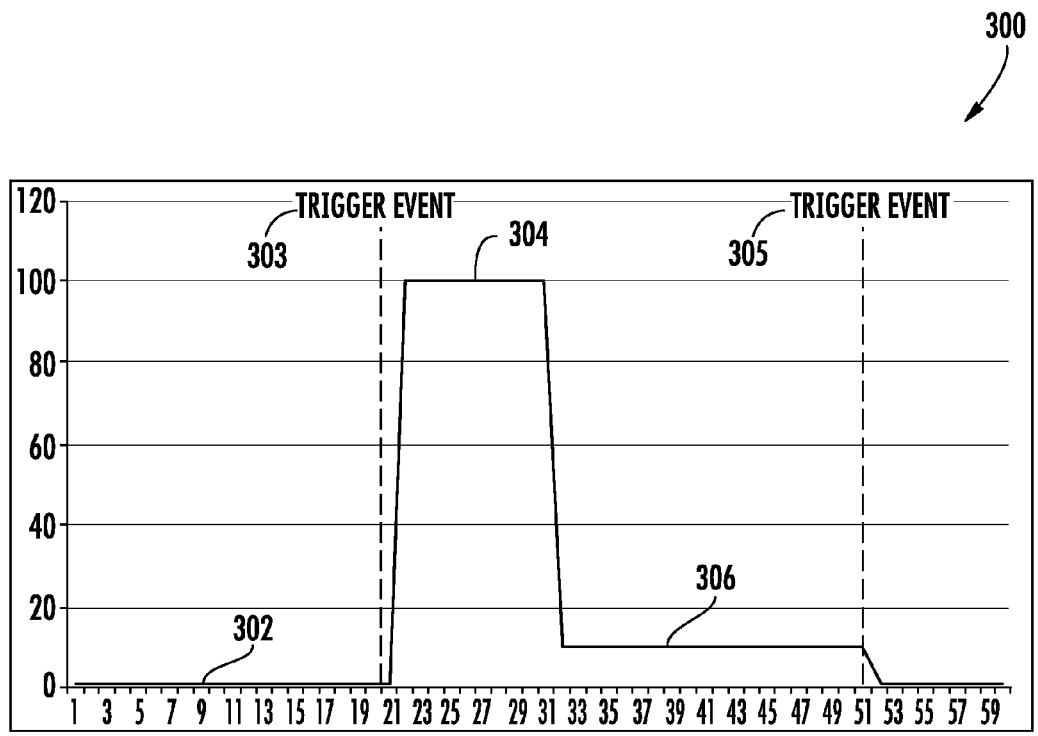
FIGS. 3-5 depict example scan rate changes based on activity level according to example embodiments of the present disclosure.

In an example embodiment, responsive to a trigger event, a user device can scan at the second scan rate for a first period of time, and subsequent to the first period of time, scan at a third scan rate for a second period of time. The third scan rate can be a lower rate than the second scan rate. For instance, FIG. 3 depicts a graphical representation 300 of example scan rates according to example embodiments of the present disclosure. Although FIG. 3 depicts scan rates of 1%, 10%, and 100%, it will be appreciated by those skilled in the art that various other suitable scan rates can be used according to example aspects of the present disclosure. For instance, a scan rate of 0% (e.g. not scanning) can be used based at least in part on an activity level associated with a user device.

Graphical representation 300 depicts a first scan rate 302 of 1% (e.g. 1.5 seconds of scanning per every 2.5 minutes). A user device can scan at first scan rate 302, for instance, while a display of the user device is turned off. When a user turns the display of the user device on, a trigger event 303 can occur and the user device can increase the scan rate to a second scan rate 304. Second scan rate 304 can be a scan rate of 100%. The user device can scan at second scan rate 304 for a first period of time following trigger event 303.

In example embodiments, after the first period of time has elapsed, the user device can scan at a reduced, third scan rate for a second period of time. For instance, 10 seconds after trigger event 303, the user device decreases the scan rate to a third scan rate 306 of 10% (e.g. 1.5 seconds of scanning per every 15 seconds). The second period of time can be determined based at least in part on data indicative of an activity level. In particular, the second period of time can be the period of time until the next trigger event. For instance, in FIG. 3, the user device can scan at third scan rate 306 until trigger event 305. Trigger event 305 can occur, for instance, when the user turns the display of the user device back off. Responsive to trigger event 305, the user device in FIG. 3 can reduce the scan rate back to 1%.

In an example embodiment, the first period of time can be a predetermined period of time, such as a period of 10 seconds, as depicted in FIG. 3. In an alternative embodiment, the first period of time can be determined based at least in part on data indicative of an activity level. In particular, the first period of time can be the amount of time after a trigger event is detected until the next trigger event is detected.

Figure 4:
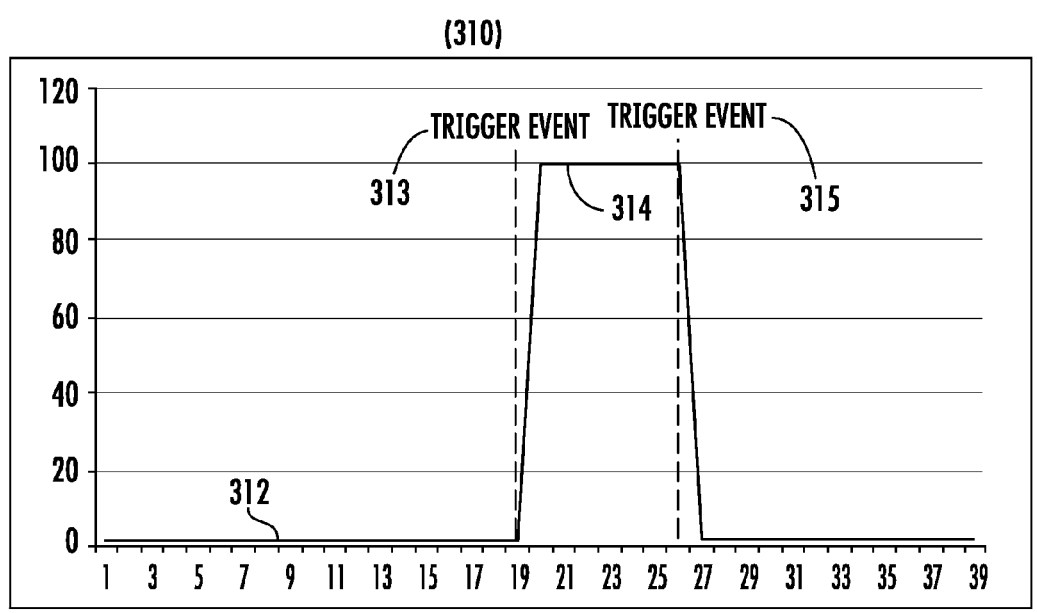

For instance, FIG. 4 depicts a graphical representation 310 of example scan rates according to example embodiments of the present disclosure. In graphical representation 310, responsive to a trigger event 313, a user device increases a scan rate from a first scan rate 312 to a second scan rate 314, and scans at the second scan rate for a first period of time. The first period of time, as depicted in graphical representation 310, is the amount of time from trigger event 313 to a trigger event 315. Responsive to trigger event 315, the user device reduces the scan rate.

In another embodiment, the first period of time can be the period of time after a trigger event is detected until the next trigger event is detected, such that the first period of time cannot exceed a maximum amount of time such as, for instance, 10 seconds. For instance, if a trigger event occurs seven seconds after the previous trigger event, the first period of time can be seven seconds. However if the trigger event occurs 12 seconds after the previous trigger event, the first period of time can end at the maximum of 10 seconds.

Figure 5:
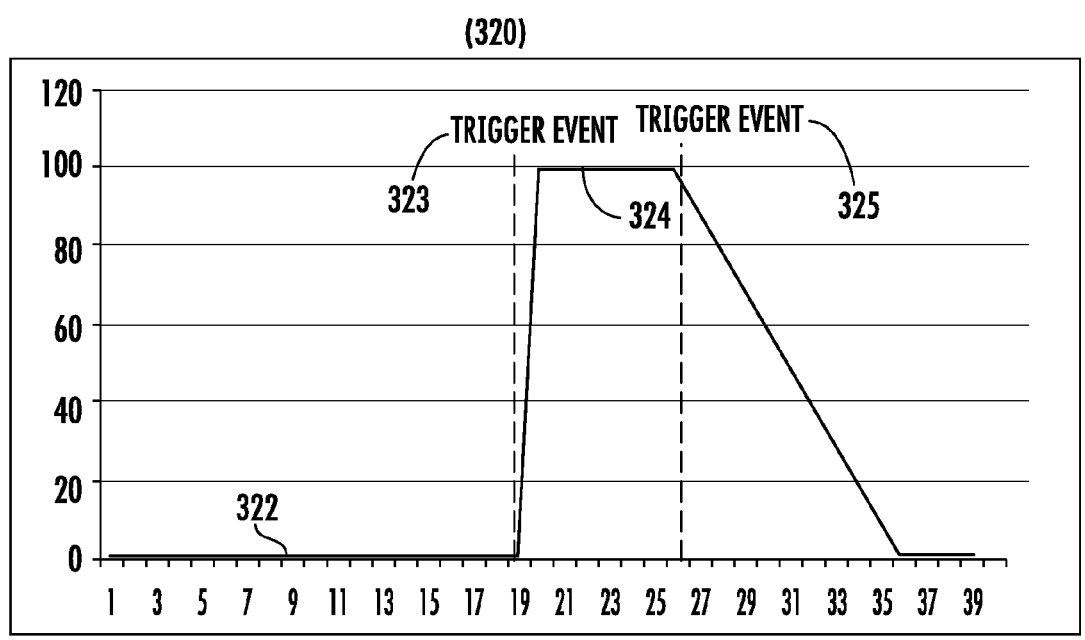

In an alternative embodiment, responsive to a trigger event, a user device can gradually reduce a scan rate. For instance, FIG. 5 depicts a graphical representation 320 of example scan rates according to example embodiments of the present disclosure. As depicted in FIG. 5, responsive to a trigger event 323, a user device can increase the scan rate from a first scan rate 322 to a second scan rate 324 for a first period of time. Responsive to a trigger event (325), the user device can gradually reduce the scan rate over time.

When scanning for one or more beacon devices, a user device can detect a beacon device by receiving data from the beacon device. For instance, referring back to FIG. 2, method (200) can include receiving data from a beacon device (208). The received data can be information identifying the beacon device as well as other information, such as location information (e.g. latitude, longitude coordinates), and/or information used to provide a notification or open an application associated with the beacon device.

Method (200) can further include performing at least one action based at least in part on the received data from the beacon device (210). For instance, a user device can use the information from the beacon device for navigation purposes, or to provide for display a notification of a sale at a retail store proximate the beacon device, or to provide for display a menu for a restaurant proximate the beacon device.

Example Computing System for Scanning for Beacon Devices

Figure 6:
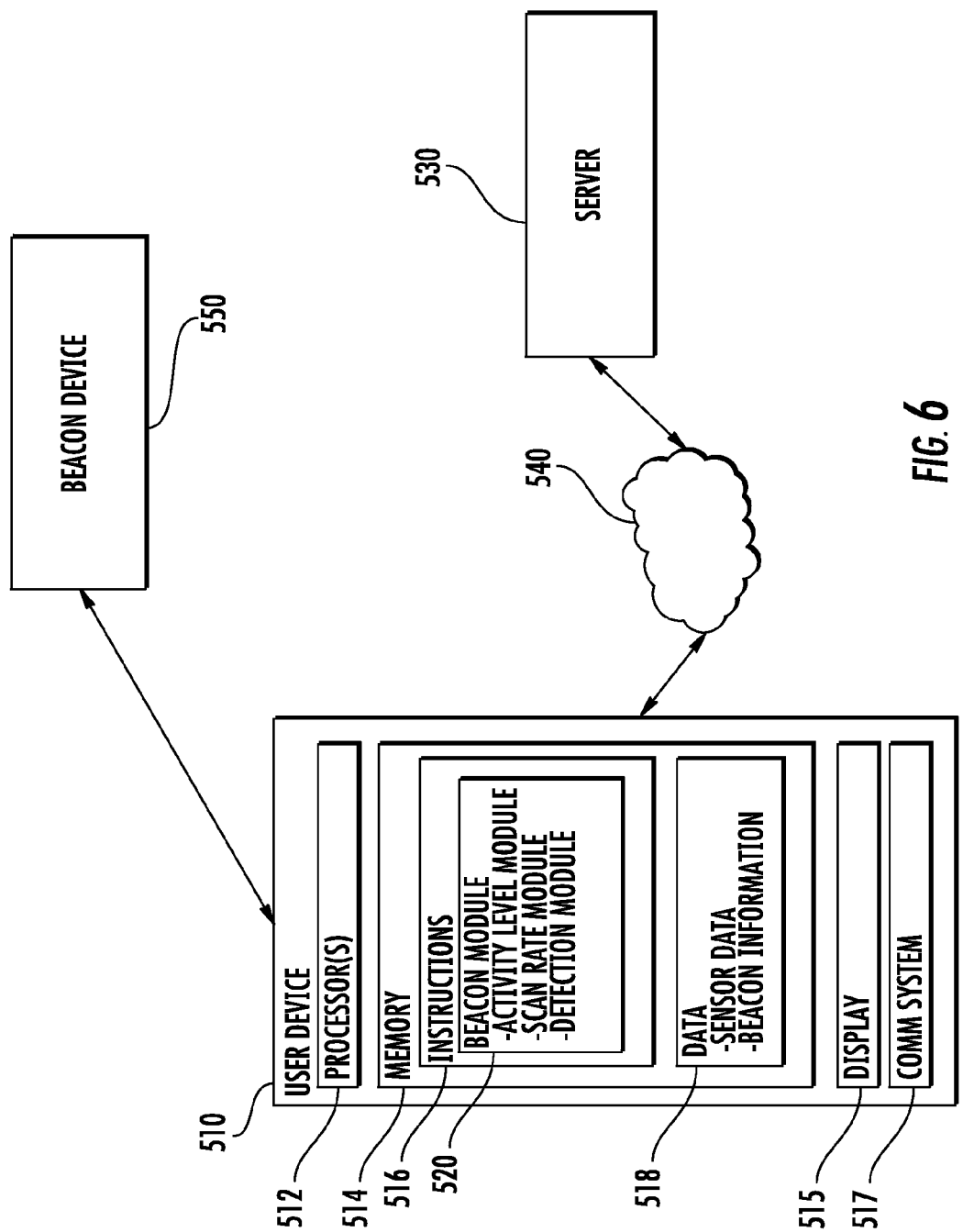
FIG. 6 depicts an example computing system according to example embodiments of the present disclosure.

FIG. 6 depicts an example computing system 500 that can be used to implement the methods and systems for scanning for beacon devices according to example aspects of the present disclosure. System 500 can include a user device 510. User device 510 can be any suitable type of mobile computing device, such as a smartphone, tablet, cellular telephone, wearable computing device, or any other suitable mobile computing device capable of being carried by a user while in operation. User device 510 can include one or more processor(s) 512 and one or more memory devices 514.

The one or more processor(s) 512 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 514 can include one or more computer-readable media, including, but not limited to, non-transitory computer-readable media, RAM, ROM, hard drives, flash memory, or other memory devices.

The one or more memory devices 514 can store information accessible by the one or more processors 512, including instructions 516 that can be executed by the one or more processors 512. For instance, the memory devices 514 can store instructions 516 for implementing one or more modules configured to implement a beacon module 520, and/or various aspects of any of the methods disclosed herein. Beacon module 520 can be configured to scan for one or more beacon devices according to example aspects of the present disclosure. Beacon module 520 can include one or more modules, such as an activity level module, a scan rate module and a detection module. The activity level module can be configured to determine an activity level associated with user device 510. The scan rate module can be configured to determine scan rates based at least in part on the activity level. The detection module can be configured to receive information from a beacon device and perform at least one action associated with the beacon device.

The one or more memory devices 514 can also include data 518 that can be retrieved, manipulated, created, or stored by the one or more processors 512. The data can include, for instance, sensor data, beacon information and/or other information.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, ROM, flash memory, hard disk or optical or magnetic media. When software is used, any suitable programming language or platform can be used to implement the module.

User device 510 can include various input/output devices for providing and receiving information from a user, such as a touch screen, touch pad, data entry keys, speakers, and/or a microphone suitable for voice recognition. For instance, user device 510 can have a display 515 for presenting a user interface to a user. User device 510 can further include a communication system 517. Communication system 517 can be used to communicate with one or more beacon devices, such as beacon device 550.

User device 510 can also include a network interface used to communicate with one or more remote computing devices (e.g. server 530) over network 540. The network interface can include any suitable components for interfacing with one more networks, including for example, transmitters, receivers, ports, controllers, antennas, or other suitable components.

In some implementations, the user device can be in communication with a remote computing device, such as a server 530 over a network 540. Server 530 can be one or more computing devices, such as described above with regard to server 118 in FIG. 1. Server 530 can also include a network interface used to communicate with computing device 510 over network 540. The network interface can include any suitable components for interfacing with one more networks, including for example, transmitters, receivers, ports, controllers, antennas, or other suitable components.

Network 540 can be any type of communications network, such as a local area network (e.g. intranet), wide area network (e.g. Internet), cellular network, or some combination thereof. Network 540 can also include a direct connection between user device 510 and server 530. Network 540 can include any number of wired or wireless links and can be carried out using any suitable communication protocol.

System 500 can further include one or more beacon devices, such as beacon device 550. Beacon device 550 can broadcast messages such as described with regard to beacon devices 102-110 in FIG. 1. Beacon device 550 can be implemented using any suitable computing device(s). Although only one beacon device is depicted in FIG. 6, it will be appreciated by those skilled in the art that any suitable number of beacon devices can be included in system 500.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of scanning for one or more beacon devices, the method comprising:
scanning, by a computing device, for one or more beacon devices at a first scan rate, each beacon device periodically broadcasting data over a distance;
detecting, by the computing device, a trigger event based at least in part on data indicative of an activity level associated with the computing device;
responsive to the trigger event, scanning, by the computing device, for one or more beacon devices at a second scan rate, the second scan rate being different from the first scan rate;
detecting, by the computing device, a detected beacon device based at least in part on the scanning for one or more beacon devices;
providing for display, by the computing device, a notification prompting the user to open an application associated with the detected beacon device; and
determining, by the computing device, a third scan rate to be associated with the detected beacon device based at least in part on whether the user interacts with the notification.

2. The computer-implemented method of claim 1, wherein the trigger event signifies a change in an activity level associated with the computing device.

3. The computer-implemented method of claim 1, wherein the second scan rate is determined proportionally to the activity level such that the second scan rate increases as the activity level increases.

4. The computer-implemented method of claim 1, wherein the data indicative of the activity level is determined based at least in part on a status of a display associated with the computing device.

5. The computer-implemented method of claim 1, wherein the data indicative of the activity level is determined based at least in part from motion sensors associated with the computing device.

6. The computer-implemented method of claim 1, wherein the data indicative of the activity level is determined based at least in part on a number of beacon devices detected by the computing device during a time period.

7. The computer-implemented method of claim 1, wherein the data indicative of the activity level is determined based at least in part on a charging status of a battery associated with the computing device.

8. The computer-implemented method of claim 1, wherein the second scan rate is determined based at least in part on the data indicative of the activity level.

9. The computer-implemented method of claim 1, further comprising:
   receiving, by the computing device, data from the detected beacon device; and
   performing, by the computing device, at least one action based at least in part on the received data from the detected beacon device.

10. The computer-implemented method of claim 9, wherein performing the at least one action comprises determining, by the computing device, a location of a user relative to the detected beacon device.

11. The computer-implemented method of claim 1, wherein at least one of the one or more beacon devices is a Bluetooth Low Energy beacon device.

12. The computer-implemented method of claim 1, wherein the computing device scans at the second scan rate for a first period of time, and subsequent to the first period of time scans at a third scan rate for a second period of time.

13. The computer-implemented method of claim 12, wherein the first period of time is determined based at least in part on the data indicative of the activity level.

14. The computer-implemented method of claim 12, wherein the second period of time is determined based at least in part on the data indicative of the activity level.

15. A mobile computing device, comprising:
   a display device;
   one or more processors; and
   one or more memory devices storing computer-readable instructions that when executed by the one or more processors cause the one or more processors to perform operations, the operations comprising:
   scanning for one or more beacon devices at a first scan rate, each beacon device periodically broadcasting data over a distance;
   detecting a trigger event based at least in part on data indicative of an activity level associated with the mobile device;
   responsive to the trigger event, scanning for one or more beacon devices at a second scan rate, the second scan rate being different from the first scan rate;
   detecting a detected beacon device based at least in part on the scanning for one or more beacon devices;
   providing for display a notification prompting the user to open an application associated with the detected beacon device; and
   determining a third scan rate to be associated with the detected beacon device based at least in part on whether the user interacts with the notification.

16. The computing system of claim 15, wherein the second scan rate is determined based at least in part on the data indicative of the activity level associated with the mobile device.

17. One or more non-transitory computer-readable media storing computer-readable instructions that when executed by one or more processors cause the one or more processors to cause a mobile device to perform operations, the operations comprising:
   scanning for one or more beacon devices at a first scan rate, each beacon device periodically broadcasting data over a distance;
   adjusting the first scan rate to a second scan rate based at least in part on data indicative of an activity level with the mobile device, the second scan rate being greater than the first scan rate;
   receiving data from the one or more beacon devices; and
   performing at least one action based at least in part on the received data from the beacon device;
   identifying a detected beacon device;
   providing for display a notification prompting the user to open an application associated with the detected beacon device; and
   determining a third scan rate to be associated with the detected beacon device based at least in part on whether the user interacts with the notification.

18. The one or more non-transitory computer-readable media of claim 17, wherein the data indicative of the activity level comprises data indicative of a status of a display associated with the mobile device, data determined from one or more motion sensors associated with the mobile device, data indicative of a number of beacon devices detected by the mobile device during a time period, data indicative of prior interactions with beacon device information, or data indicative of a charging status of a battery associated with the mobile device.

* * * * *